No. 830,941. PATENTED SEPT. 11, 1906.
C. H. WALDEN.
WELT INNERSOLE FOR WELT BOOTS AND SHOES AND METHOD
OF MANUFACTURING THE SAME.
APPLICATION FILED NOV. 11, 1905.

Witnesses.
Gertrude M. Stucker.
Mary C. D. Walters.

Inventor.
Charles H. Walden,
By Meyers, Cushman & Rea
Attorneys.

UNITED STATES PATENT OFFICE.

CHARLES H. WALDEN, OF LYNN, MASSACHUSETTS, ASSIGNOR OF ONE-HALF TO ALBERT DENTON LOCKE, OF NEWTON, MASSACHUSETTS.

WELT INNERSOLE FOR WELT BOOTS AND SHOES AND METHOD OF MANUFACTURING THE SAME.

No. 830,941.   Specification of Letters Patent.   Patented Sept. 11, 1906.

Application filed November 11, 1905. Serial No. 286,783.

*To all whom it may concern:*

Be it known that I, CHARLES H. WALDEN, a citizen of the United States, residing at Lynn, in the county of Essex and State of Massachusetts, have invented new and useful Improvements in Welt Innersoles for Welt Boots and Shoes and Methods of Manufacturing the Same, of which the following is a specification.

My invention relates to an improved welt innersole for boots and shoes and a method of manufacturing the same, and has for its object the production of an efficient innersole with great economy of material and cost of manufacture.

Heretofore in the manufacture of welt innersoles channeled to provide a feather and a channel having a channel-lip or a channel with a channel-lip and a channel-flap it has been necessary to utilize relatively thick and costly stock, because manifestly in the first place the channel-lip in one type of innersole and the intervening stock between the channel-lip and channel-flap in another well-known type must be sufficiently stable and tenacious to sustain the stitches by which the uppers and welts are secured to the innersole, and in the second place the stock of which the innersole is fashioned must be sufficiently thick or have sufficient body to stand up to or sustain the action of the knives or appliances for cutting the channel therein. Welt innersoles so constructed as heretofore are quite costly. I have discovered that an equally efficient welt innersole of either type above referred to may be produced at a great saving in cost and economy of high-grade stock and whereby thin pieces of stock (which have heretofore not been found suitable for use in the manufacture of welt innersoles) may be utilized, and I have devised a method of manufacture and means for the carrying into effect thereof.

Having the foregoing object in view, my invention consists in the novel method of manufacture of welt innersoles and the product thereof, hereinafter set forth, and pointed out in the appended clauses of claim.

Figure 1:
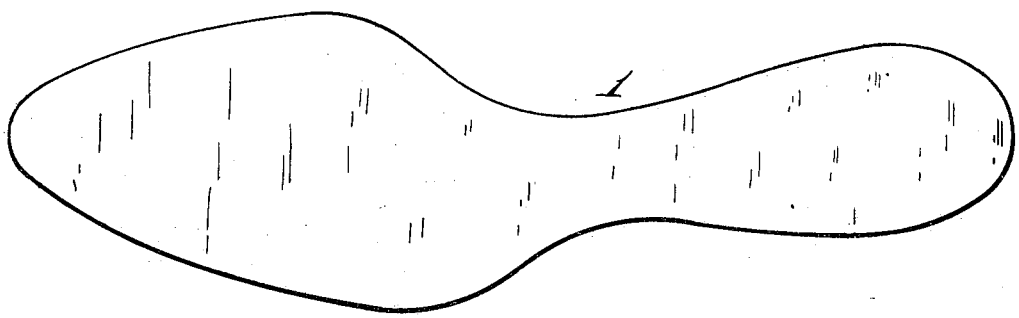
Figure 2:
Figure 3:
Figure 4:
Figure 5:

In the accompanying drawings, illustrating welt innersoles produced according to my invention, Figure 1 is a plan view. Fig. 2 is a side view designed to illustrate a relatively thin piece of customary high-grade leather stock having the contour of an innersole. Fig. 3 is a similar view of similarly-shaped inferior or more economical stock. Fig. 4 is a sectional view of that type of innersole provided with a channel, a channel-lip, and a channel-flap; and Fig. 5 is a similar view of an innersole having a channel-lip and a channel-flap.

According to my invention a piece of relatively thin customary-grade leather stock (numbered 1 in the drawings) may be cut in the usual manner by hand or machine into the external shape-or contour of an innersole, and onto the feather face of the same for the purpose of providing a sufficient mass or body to stand up under or sustain the action of channeling knives or cutters is secured a backing or base strip of inferior or more economical material 2, which may consist of an inferior grade of leather, leather scrap, leatheroid, paper, or other suitable material capable of serving the end stated—that is to say, afford a sufficient mass or body to stand up under the action of the channeling-knives and under the operation of stitching the upper and welt thereto. The material 2 may be secured to the material 1 by means of any suitable adhesive, such as glue or cement, or in any other suitable manner. When so combined or associated, the pieces of material 1 and 2 provide an innersole-blank of sufficient body or material to stand up under the action of the channeling knives or cutters and enable an accurate channel 3 and a perfect channel-lip 4 and channel-flap 5 to be produced in the customary-grade leather stock 1, which would not be feasible if such relatively thin piece of stock 1 were used in and of itself.

When the parts 1 and 2 have been secured together, the channel is produced in the part 1 in any of the well-known ways and by any of the well-known means, and this channel may either be one cut only from the outer edge of the stock inward or may have a channel-flap. The channel being thus produced in the relatively thin high-grade leather stock, the inner sole is equally efficient with but more economical than channeled innersoles as heretofore manufactured, for it will be observed than the channel-lip produced is of customary-grade leather stock having the required stability and quality to sustain and maintain the stitching by which the upper and welt are secured thereto, and when the innersole is of the channeled type having a channel-flap the intervening web (designated by the numeral 6) is of the required stability and quality to sustain and maintain the upper and welt securing stitches, and in both instances the feather 7 is of the required thickness of body to impart a desired rigidity to the innersole.

The cost of welt innersoles for boots and shoes is a material item of expense in the manufacture of welt footwear, and a need for a more economical welt innersole has long been felt, but, so far as I am aware, has never been filled prior to my invention. The cost of high-grade leather stock of sufficient thickness to present to the innersole the required body to withstand the action of channeling knives or cutters and otherwise perform the function of a welt innersole has been seriously felt. Attempts have been made to substitute in totality inferior-grade stock and composite or scrap stock, but according to those ideas innersoles are of unsatisfactory character, as the nature of the material of which they are composed is not sufficiently stable to properly receive and sustain the stitches by which the upper is intended to be secured thereto, and, furthermore, when it has been attempted to channel such inferior-grade or scrap stock innersoles the stock splits along the line of cleavage of the channeling-knives. For this reason innersoles of such inferior-grade material have not been found satisfactory. I am aware also that innersoles have been reinforced by securing to the channel-lip side thereof canvas or similar material; but such propositions have been for an altogether different purpose, and, so far as I am aware, no one has ever proposed the utilization of a relatively thin piece of customary-grade stock in which the channel is to be cut to provide a channel-lip or intervening material in a welt innersole having a stability and quality requisite to sustain the stitches which secure the uppers and welts thereto and to supplement said relatively thin strip of leather stock with a base or backing to give mass or body sufficient to stand up under the action of the channeling knives or cutters.

When the innersole has been manufactured as described and the upper and welt have been stitched thereto, the part 2 of inferior material may, if desired, be removed, or it may be allowed to constitute a permanent part of the innersole. My invention, so far as the method is concerned, is not restricted in this respect. It will be found desirable, however, in all cases where a feather of suitable thickness to impart the required rigidity to the innersole is desired not to remove the part 2 of the innersole. If it is desired to remove such part after the complete construction of the innersole, this may be done after the upper is stitched to the part 1 thereof and before the shoe is heeled.

By my invention the cost of production of welt innersoles which are equally efficient with an all high-grade leather article is very greatly reduced and a want which has been long felt in the art is supplied.

By the term "welt innersole" as used in the foregoing description and in the following claims is meant that inner sole *per se* which is ordinarily embodied in the construction of a welt shoe as contradistinguished from such a welt innersole having added thereto for purposes outside the requirement of the article as a welt innersole auxiliaries such as means for rendering the same waterproof or the like. By the term "relatively thin" applied to the layers 1 and 2 is meant relatively thin as compared with the completed welt innersole.

Having thus described my invention, what I claim as new, and desire to secure by Letters Patent, is—

1. A method of manufacturing welt innersoles for boots and shoes which consists in first adding inferior mass or body to a relatively thin piece of customary-grade leather stock and then channeling the leather stock.

2. A method of manufacturing welt innersoles for boots and shoes, which consists in securing to a relatively thin piece of high-grade leather stock a base or backing of inferior material and then channeling the leather stock.

3. A method of manufacturing welt innersoles for boots and shoes which consists in securing to a relatively thin piece of customary-grade leather stock a base or backing of inferior material and then channeling the leather stock to produce a leather channel-lip and a composite feather.

4. A method of manufacturing welt innersoles for boots and shoes which consists in securing to a relatively thin piece of customary-grade leather stock a base or backing of inferior material and then channeling the leather stock to produce a leather channel-lip and channel-flap and intervening web and a composite feather.

5. The herein-described welt innersole for boots and shoes, consisting of a relatively thin piece of leather stock and a relatively thin layer of inferior-grade material, superimposed thereon, and secured thereto, the piece of leather stock being channeled.

6. The herein-described welt innersole for boots and shoes consisting of a relatively thin piece of leather stock and a relatively thin layer of inferior-grade material superimposed thereon and secured thereto, the piece of leather stock being channeled, and a portion of the leather stock, together with the inferior-grade piece constituting a composite feather.

In testimony whereof I have hereunto set my hand in presence of two subscribing witnesses.

CHARLES H. WALDEN.

Witnesses:
GEO. F. SUMMERS,
H. E. MAYNARD.